No. 827,747. PATENTED AUG. 7, 1906.
J. MOREAU.
ROSSING MACHINE.
APPLICATION FILED SEPT. 28, 1904.
6 SHEETS—SHEET 1.
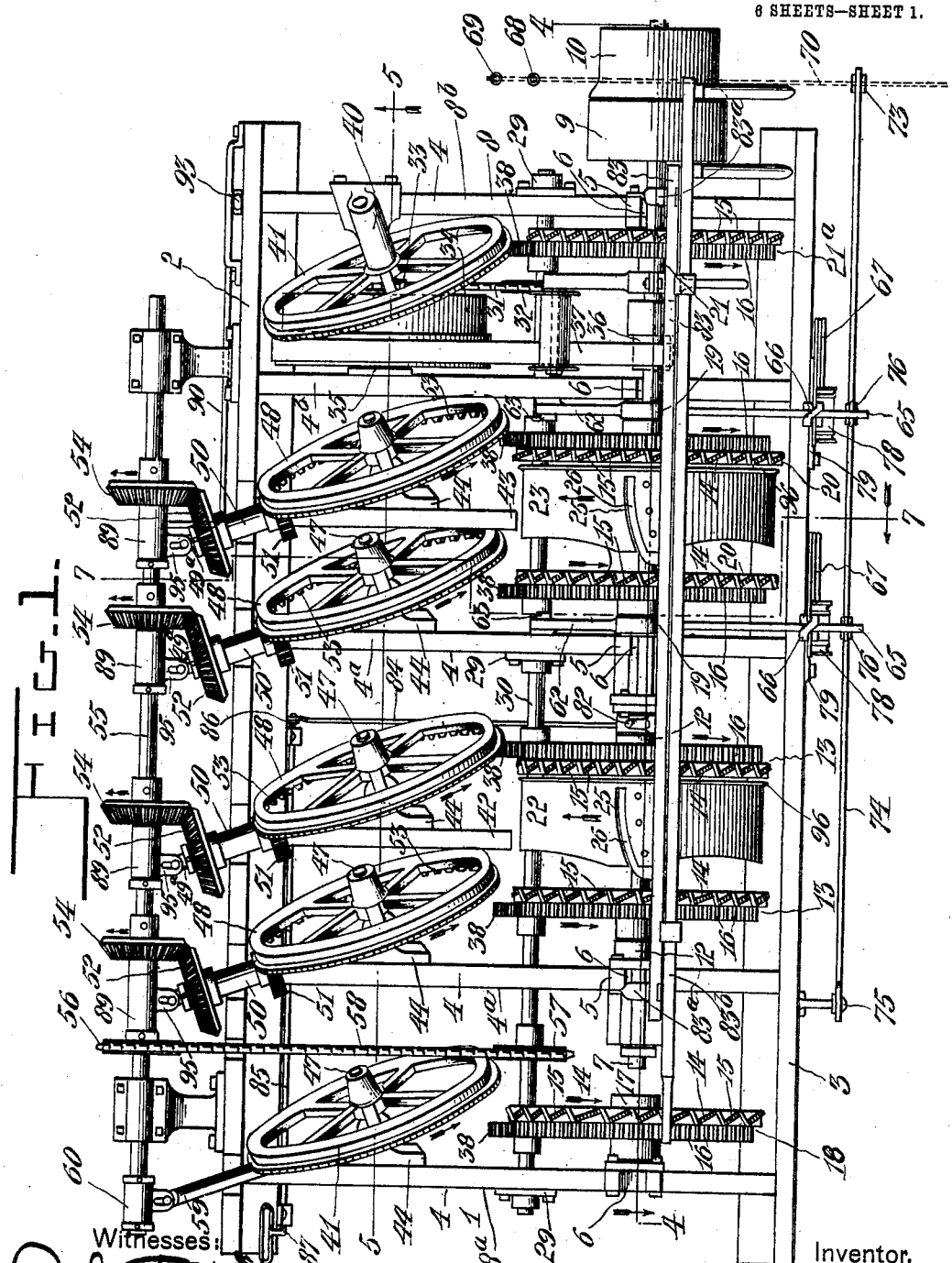
Witnesses:
John F. Dafferwis
J. H. Gibbs
Inventor,
Joseph Moreau.
By Marion & Marion
Attorneys No. 827,747. PATENTED AUG. 7, 1906.
J. MOREAU.
ROSSING MACHINE.
APPLICATION FILED SEPT. 28, 1904.
6 SHEETS—SHEET 2.
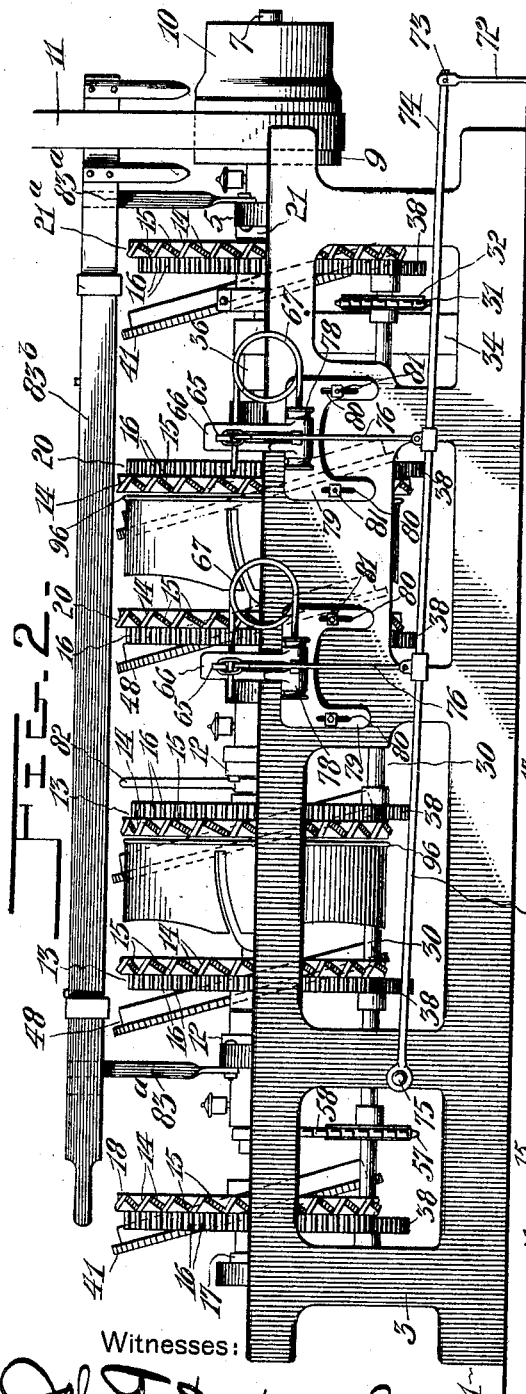
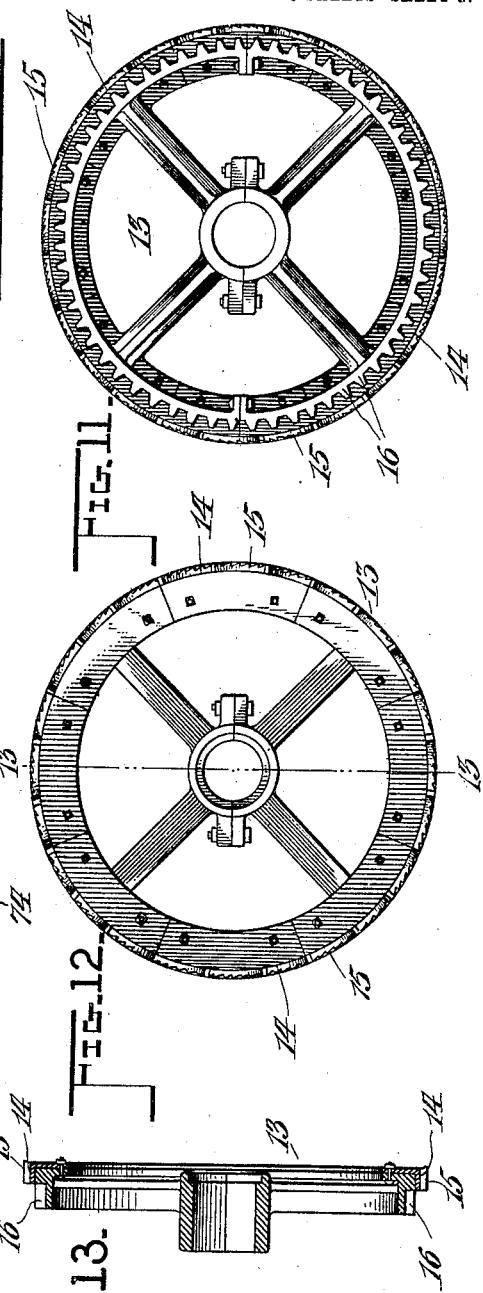
Witnesses:
Joseph Moreau, Inventor,
By Marion & Marion
Attorneys No. 827,747. PATENTED AUG. 7, 1906.
J. MOREAU.
ROSSING MACHINE.
APPLICATION FILED SEPT. 28, 1904.
6 SHEETS—SHEET 3.
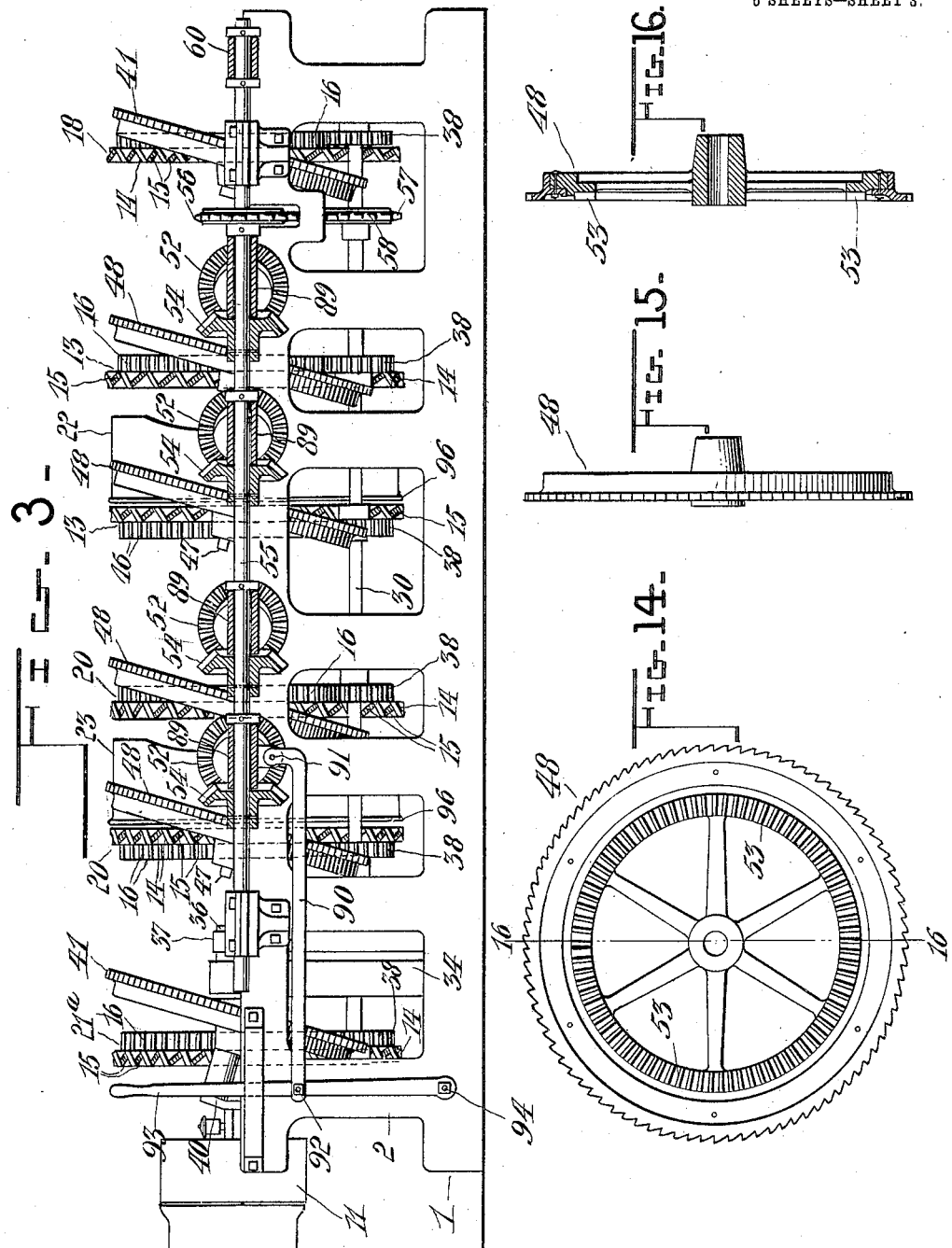
Witnesses:
Joseph Moreau, Inventor,
By Marion+Marion
Attorneys No. 827,747. PATENTED AUG. 7, 1906.
J. MOREAU.
ROSSING MACHINE.
APPLICATION FILED SEPT. 28, 1904.
6 SHEETS—SHEET 4.
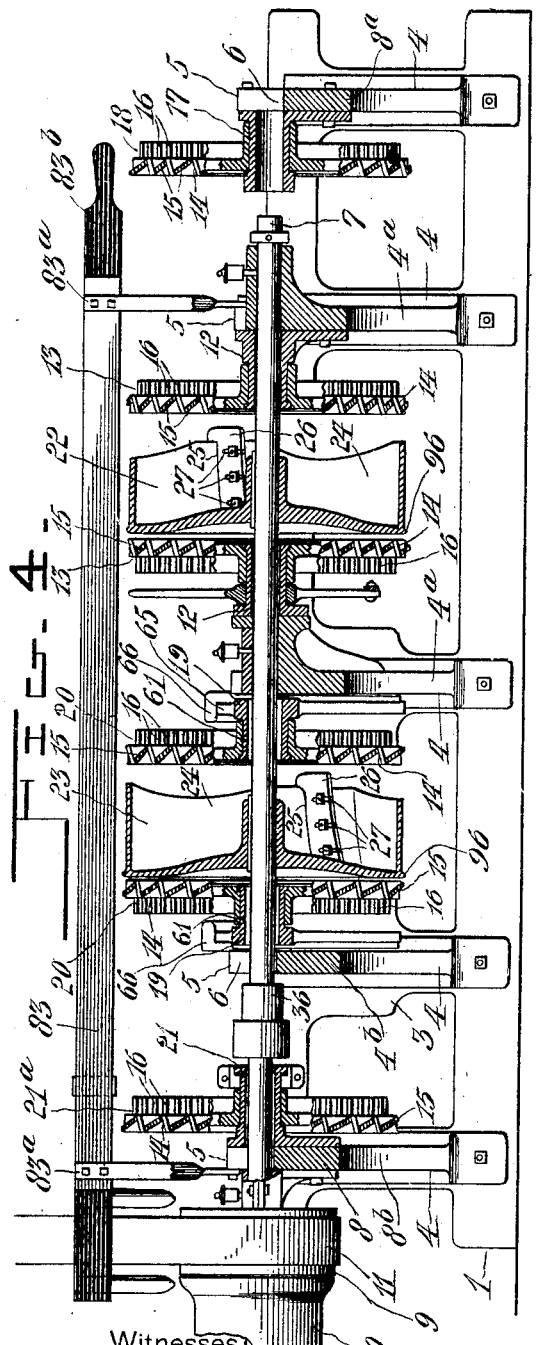
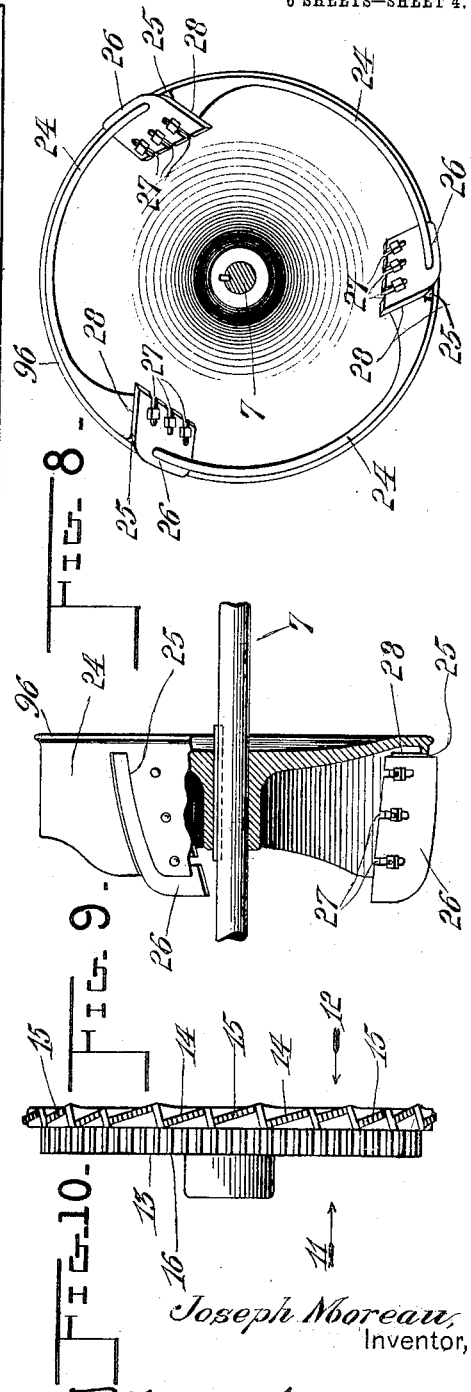
Joseph Moreau,
Inventor,
Witnesses
By Marion & Marion
Attorneys No. 827,747. PATENTED AUG. 7, 1906.
J. MOREAU.
ROSSING MACHINE.
APPLICATION FILED SEPT. 28, 1904.
6 SHEETS—SHEET 5.
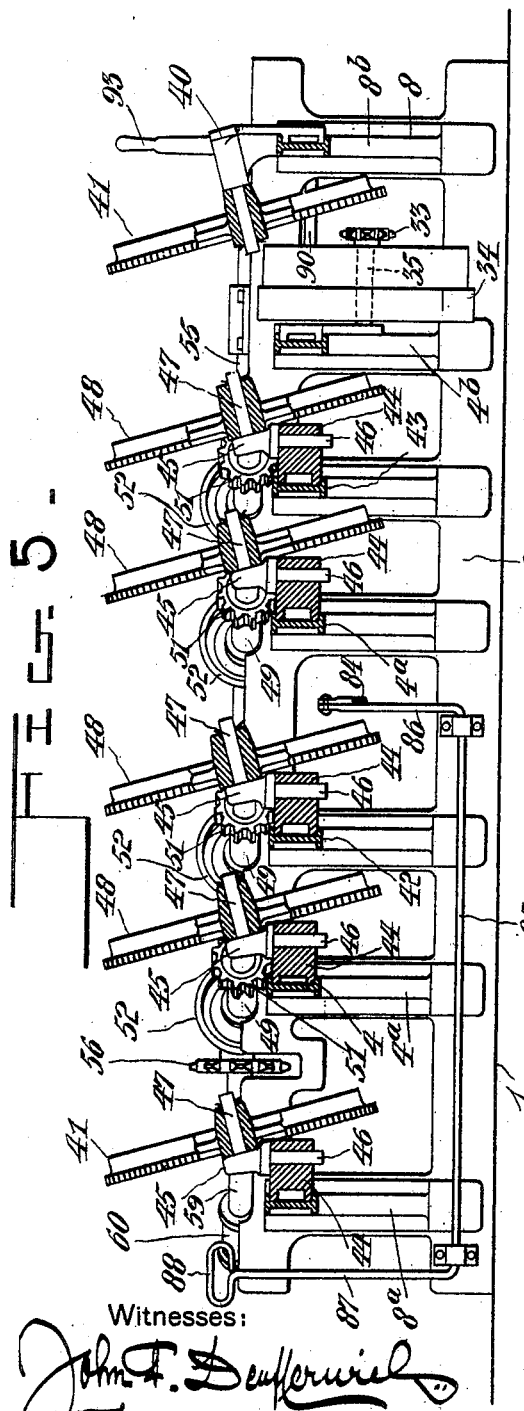
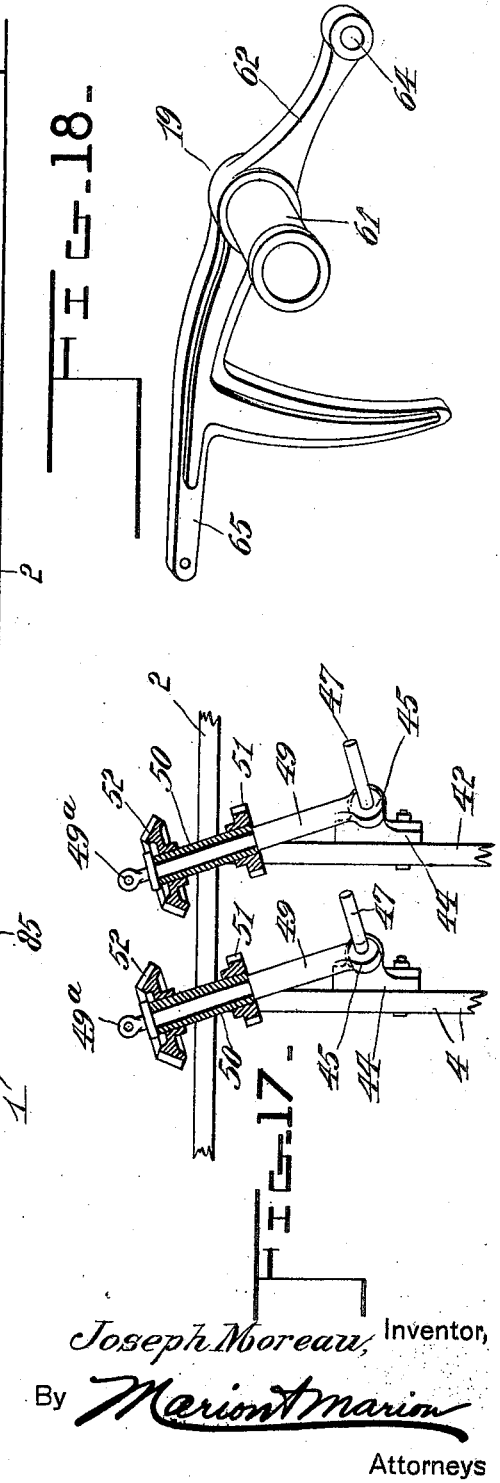
Witnesses:
Joseph Moreau, Inventor,
By Marion & Marion
Attorneys No. 827,747. PATENTED AUG. 7, 1906.
J. MOREAU.
ROSSING MACHINE.
APPLICATION FILED SEPT. 28, 1904.

6 SHEETS—SHEET 6.

Witnesses:

Joseph Moreau, Inventor,

By Marion & Marion
Attorneys

UNITED STATES PATENT OFFICE.

JOSEPH MOREAU, OF ST. GERMAIN DE GRANTHAM, CANADA.

ROSSING-MACHINE.

No. 827,747.　　　　Specification of Letters Patent.　　　Patented Aug. 7, 1906.

Application filed September 28, 1904. Serial No. 226,337.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Rossing-Machines; and I do hereby declare that the following is a full, clear, and exact description of the invention, such as will enable others skilled in the art to which it appertains to make and use the same.

My invention relates to a machine for removing the bark from logs, and especially those logs which are used in the manufacture of wood-pulp, the object being to quickly and completely remove as much as possible of the bark, while removing the minimum of wood fiber.

The object of my invention is to produce a simplified and improved machine over that described in my United States Patent No. 735,793.

In the accompanying drawings, forming a part of this application, I have illustrated one form of embodiment of my invention, in which drawings similar reference-numerals designate corresponding parts, and in which—

Figure 6:
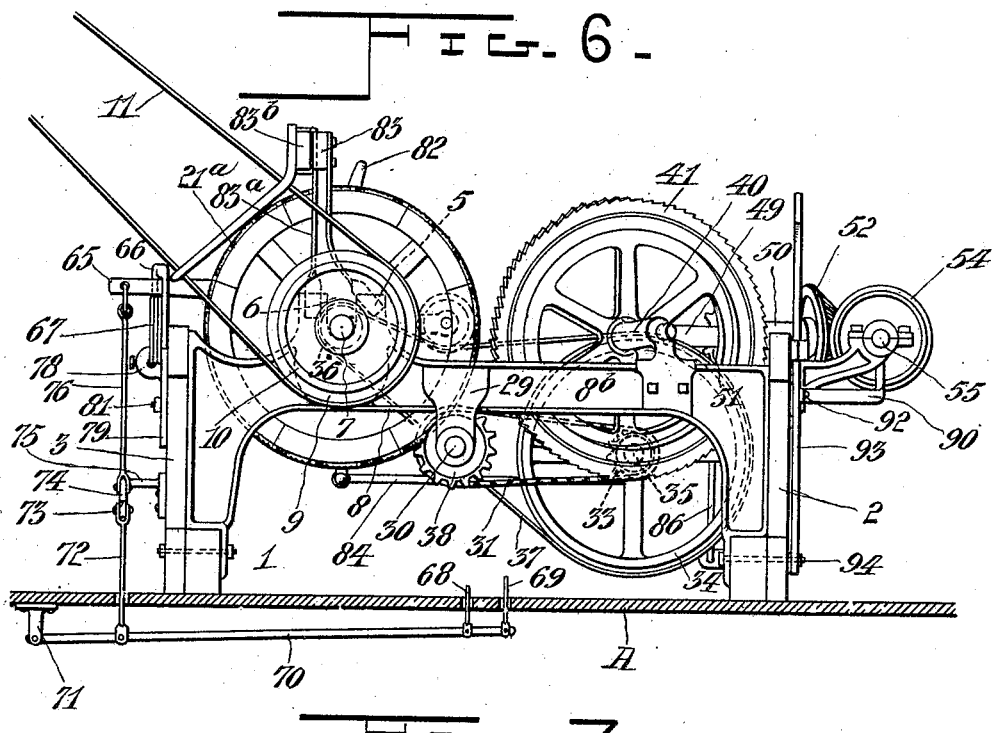
Figure 7:
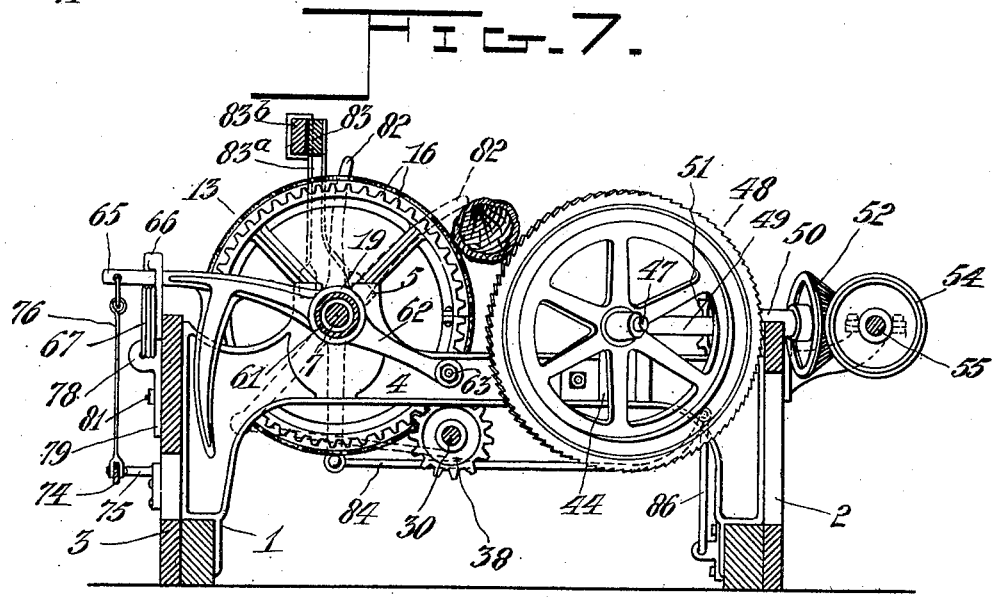

Figure 1 is a plan view of the machine. Fig. 2 is a side elevational view thereof. Fig. 3 is a view looking from the side opposite to that indicated in Fig. 2 with some of the parts shown in section to better illustrate details thereof. Fig. 4 is a longitudinal sectional view taken approximately on line 4 4 of Fig. 1 looking in the direction indicated by the arrow. Fig. 5 is a longitudinal sectional view of Fig. 1 on line 5 5 looking in the direction indicated by the arrow 5. Fig. 6 is an end view of the machine. Fig. 7 is a transverse sectional view taken approximately on line 7 7 of Fig. 1. Fig. 8 is a side elevational view of one of the cutter-heads or rossing-wheels hereinafter referred to. Fig. 9 is an edge view of said wheel with parts thereof broken away. Fig. 10 is an edge view of one of the log-turning wheels carried upon the same shaft with the cutter-head shown in Figs. 8 and 9. Fig. 11 is a side elevational view of Fig. 10 looking in the direction of the arrow 11. Fig. 12 is a side elevational view thereof looking in the direction of the arrow 12. Fig. 13 is a vertical sectional view taken approximately on line 13 13 of Fig. 12. Fig. 14 is a side elevational view of one of the feed-wheels hereinafter referred to. Fig. 15 is an edge view of one of said wheels. Fig. 16 is a vertical sectional view taken on line 16 16 of Fig. 14. Fig. 17 is a detached detail view, partly in section, showing means for driving the feed-wheels; and Fig. 18 is a perspective view of a yoke adapted to carry one of the adjustable log-turning wheels hereinafter referred to.

Referring more particularly to the parts, 1 represents the frame of the machine, the same comprising a front plate 2 and a rear plate 3, disposed substantially parallel with respect to each other and connected by a plurality of transverse members or beams 4. These beams 4 are formed toward the rear plate 3 into pedestals or pillow-blocks 5, which have deep centrally-disposed notches 6, which receive a rotatable shaft 7, as shown, which shaft projects at one extremity through one of the end plates 8 and carries a tight and a loose pulley 9 and 10, respectively, the same being driven by a suitable belt 11, as indicated.

There are preferably a plurality of the beams 4, as indicated. To the two beams 4$^a$, which are located toward the receiving end of the machine, there are rigidly attached sleeves 12, which sleeves comprise elongated necks upon which wheels or log-turners 13 are rotatably mounted. As shown, these wheels have projecting peripheries 14, provided with inclined circumferentially-disposed ribs or teeth 15, and a portion of each wheel is formed so as to constitute a gear-wheel 16 to enable the said wheels 13 to be driven in a manner which will appear more fully hereinafter. To the end plate 8$^a$ at the receiving end of the machine a sleeve 17 is rigidly attached, the same being substantially similar to the sleeves 12 aforesaid and carrying a wheel 18, which is substantially similar to the wheels 13, already described.

Adjacent to the beam 4$^b$, which is located toward the delivering end of the machine, sleeves 19 are arranged, the same being substantially similar to the sleeves 12 and 17, already described, except that they are not attached to the beams, but are supported in a manner which will be described more fully hereinafter. Upon the sleeves 19 wheels 20 are rotatably mounted, said wheels being substantially similar in construction to the wheels 13 and 18, already described. To the end plate or beam 8$^b$ of the machine at the delivery end a sleeve 21 is attached, which is substantially similar to the sleeve 17, described in connection with the opposite end of the machine, and this sleeve rotatably supports a wheel 21ª, which is in all respects similar to the wheels 13, 18, and 20, already described.

Between the wheels 13 a knot-cutter wheel 22 is rigidly attached to the shaft 7, and in a similar manner a bark-cutter wheel 23 is attached to the shaft between the wheels 20. The construction of these cutter-wheels will appear from an inspection of Figs. 8 and 9. They comprise rims 24, having slots 25, through which knives 26 project, the said knives having solts 27, which enable them to be attached, by means of bolts, to faces 28 under the rims, all as shown.

To the end beams or plates 8ª and 8ᵇ hangers 29 are attached, the same depending downwardly, as shown, and supporting rotatably a counter-shaft 30. This counter-shaft is driven continuously by means of a sprocket-chain 31, running over a sprocket-wheel 32, carried by the counter-shaft, the said chain being driven through the medium of a sprocket-wheel 33, which is rigidly carried by the hub of a pulley 34, the said pulley being rotatably mounted upon a stud-shaft 35, carried by one of the beams 4ᵇ. This pulley 34 is in alinement with a pulley 36, which is rigidly carried by the extremity of the shaft 7, as shown, and is driven therefrom through the medium of a belt 37. The counter-shaft 30 carries a plurality of pinions 38, which mesh with the gear-teeth of the wheels 13, 18, 20, and 21ª, from which arrangement it follows that when the shaft 7 is continuously rotated the said wheels will all be rotated in the opposite direction from the shaft.

To the end beams or plates 8ª and 8ᵇ at substantially the points shown brackets 40 are attached, which brackets support rotatable idlers or idle wheels 41, which wheels are preferably disposed askew, as shown, the planes of the wheels being inclined both horizontally and vertically with respect to the direction of the main shaft 7 of the machine. Between these idlers 41 special beams 42 and 43 are provided, the same projecting from the front wall 2 of the machine, as shown. Upon these beams 42 and 43 and upon the foremost of the beams 4ª and 4ᵇ brackets 44 are attached, (see Fig. 5,) the same constituting bearings for swivel-heads 45, having stems 46, which pass downwardly toward the base of the machine, as shown.

The swivel-heads 45 are provided with inclined stub-shafts 47, which serve as supports for the feed-wheels 48, while angularly-projecting supplemental stub-shafts 49, having reduced end portions, serve as supporting means for the loosely-mounted rotatable sleeves 50, which sleeves are provided with the pinions 51 and 52, meshing, respectively, with the circumferentially-disposed bevel gear-teeth 53, formed upon the feed-wheels, and with the bevel-gears 54, which are carried upon the shaft 55, as shown in Fig. 1. This shaft 55 is driven from the shaft 30 by means of sprocket-wheels 56 and 57, about which pass the sprocket-chain 58, so that when the shaft 30 is rotated the said feed-wheels 48 are likewise driven.

Located nearest the feed end of the machine, which is at the left-hand side of the plan view Fig. 1, the wheel 41 is mounted upon a bracket 44, like the other feed-wheels, but is not driven from said shaft 55. Instead of being driven from said shaft an arm 59 connects the swivel carrying the wheel 41 with a sleeve 60, which is carried upon said shaft 55, so as to rotate the swivel carrying said wheel 51 in the event of the shaft 55 being shifted longitudinally. It will be observed that the feed-wheels 48 and 41 are rotated in the direction indicated by the arrow, which is in a direction opposite to the direction of rotation of the cutting-wheels referred to, and owing to the angularity of the feed-wheels with relation to the said cutting-wheels and the log-turning wheels referred to it is evident that upon rotation of said feed-wheels a log will be carried through the machine and respectively past the knot-cutting wheel 22 and the rossing-wheel 23.

The log-turning wheels from the feed end of the machine to and including the wheel next adjacent the knot-cutting wheel are fixed with relation to the axis of the shaft 7, but rotate in an opposite direction thereto; but the wheels 20, being mounted upon the sleeves 19, are held upon the trunnions 61 of the pivoted yokes 62, which yokes are supported, as shown in the plan view Fig. 1, upon studs 63, projecting laterally from the supporting-frame, said studs 63 projecting through openings 64 in the inner end of the said yoke 62 and serving as pivotal supporting means for said yokes. The opposite ends of said yokes terminate in extensions 65, which are projected through twisted loops 66, as shown in Figs. 1 and 2, and extend slightly therebeyond.

Bearing against the ends 65 of the yoke 62 are helical springs 67, the tendency of which is to hold the ends 65 normally in an elevated position, thereby supporting the log-turning wheels 20 normally in such position as to project beyond the edges of the knives 26, carried by the rossing-wheel, thereby supporting the log normally away from said cutting-knives. When, however, it is desired to bring the log into closer proximity to said knives, the yokes 62 are rocked upon their pintles 63 by means of the push-rods 68 and 69, which project through the floor A, as shown in Fig. 6. These push-rods extend upwardly from the lever 70, which is pivotally carried by the bracket 71 and has connected therewith the rod 72, which is pivotally connected at 73 with the longitudinally-extending rod 74, which is carried at 75 from the main frame of the machine. The rod 74 carries arms 76, which are connected at their upper ends with the ends 65 of said yokes 62, so that when it is desired to lower the turning-wheels 20 the push-rods 68 and 69 may be depressed, the shorter rod 68 being used when it is desired to lower said wheels only a slight distance and the longer rod 69 when it is desired to lower said wheels 20 a sufficient distance to carry the log into contact with the cutting-knives 26.

To tension the springs 67, their lower ends are preferably carried in sockets 78, which form a part of the slidable yokes 79, which yokes are provided with vertically-extending slots 80, through which set-screws 81 project and by means of which said spring-carrying yokes 79 regulate the tension of said springs with relation to the yokes 62, as may be found necessary.

In the operation of the machine it has been found that the log has a tendency to rise away from the cutter-heads, and to overcome this tendency a presser-bar 82 is provided, the upper end of which normally rests in proximity to the buffer-head 83. Said presser-bar is pivotally supported upon the sleeve 12, carried by the main driving-shaft 7, and extends therebelow, as shown in Fig. 6. To the lower end of the presser-bar is connected a rod 84, which extends to the side of the machine opposite the buffer 83 and is connected with the longitudinally-extending rod 85, which is provided with an upward crank extension 86, pivotally connected with the said member 84, while a corresponding upward crank extension 87 extends from said rod 85 and terminates in a handle portion 88, by means of which said presser-bar may be manipulated. Drawing the handle 88 toward the central longitudinal axis of the machine will project the presser-bar to the position shown in dotted lines in Fig. 7, where it is shown as bearing upon a log, in which position said presser-bar serves to hold the log against the cutting-knives of the rossing-wheel. As shown in Fig. 3, the gears 54 are carried upon the shaft 55 by means of sleeves 89, which are pinned to said shaft, while an arm 90 is pivotally connected at 91 to one of said sleeves 89 and extends toward the end of the machine, where it is pivotally connected at 92 to the speed-lever 93, which is in turn pivotally connected at 94 to the frame of the machine. By means of the lever 93 the shaft 55 may be shifted longitudinally, thereby swinging the spindles 46 of the feed-wheels for the purpose of changing the angularity of such feed-wheels and regulating the feed of a log through the machine, and it will be evident that the teeth of the intermeshing beveled gears 52 and 54 should be of sufficient length to permit slight adjustment of said shaft without causing disengagement of such gears. The ends of the stub-shafts 49 are provided with loops 49$^a$, which are pivotally connected to loops 95, projecting from said sleeve 89, so as to lock the sleeves 50 upon their supports, thereby holding the gears 52 and 54 in engagement in their adjusted position.

As will be observed in Figs. 8 and 9, the cutter-heads, comprising the knot-cutting wheel and rossing-wheel, are provided with beveled flanges 96, which constitute stops or guards which receive and support the log to prevent its becoming jammed between the log-turning wheels and feed-wheels upon depression of the log-turning wheels. This provides an advantageous structure in that it provides stops for determining the lowest position of a heavy log whose weight is sufficient to abnormally compress the springs 67, which support the log-turning wheels in their upper position. Further, it will be apparent that depression of the yoke 62, carrying the log-turning wheels, tends to separate said wheels from the coöperating feed-wheels to sufficient extent to permit jamming of small logs between said coöperating wheels. Under such conditions the small logs would be supported by the flanges 96 and the adjacent feed-wheels, thereby preventing danger of accidental jamming of the logs between the wheels. It will be understood that the power-belts to the pulleys 9 and 10 and the gears 54 and 52 are all disposed outside the frame of the machine. This arrangement prevents these rapidly-moving parts from becoming clogged with chips and flying particles of bark, which has been found objectionable in this class of machines. The buffer-bar 83 is provided with loops 83$^a$, whereby the belt-shifting bar 83$^b$ is properly supported in position, and through which loops said bar may be slid longitudinally to shift the driving-belt 11, as may be required. It will be understood that the belt-shifting bar may be operated from the receiving end of the machine, so that the machine may be stopped by an operator stationed at that end in case a log is improperly inserted in the machine.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In an apparatus of the character described, the combination of cutting-wheels, coöperating sets of log-turning wheels and feed-wheels, means for depressing certain of said log-turning wheels relative to the cutting-wheels, and means for yieldingly maintaining such depressible wheels in their uppermost position, substantially as described.

2. In an apparatus of the character described, the combination of cutting-wheels, coöperating sets of log-turning wheels and feed-wheels, means for depressing certain of said log-turning wheels relative to the cutting-wheels, and adjustable resilient means for yieldingly maintaining such depressible wheels in their uppermost position, substantially as described.

3. In a rossing-machine, the combination of cutting-wheels, coöperating sets of log-turning wheels and feed-wheels, means for depressing certain of said log-turning wheels relative to the cutting-wheels, means for yieldingly maintaining such depressible wheels in their uppermost position, and guards for receiving the log upon undue depression of said log-turning wheels, substantially as described.

4. In a rossing-machine, the combination of cutting-wheels, knives extending from the peripheries of said wheels, coöperating sets of log-turning wheels and feed-wheels, means for yieldingly maintaining said log-turning wheels in their uppermost position, and guards carried by said cutting-wheels for receiving a log upon undue depression of said log-turning wheels, substantially as described.

5. In a rossing-machine, the combination of cutting-wheels, knives extending from the peripheries of said wheels, coöperating sets of log-turning wheels and feed-wheels, means for yieldingly maintaining said log-turning wheels in their uppermost position, and an annular guard-flange carried by the peripheries of said cutting-wheels for receiving a log upon undue depression of said log-turning wheels, substantially as described.

6. In an apparatus of the character described, the combination of a series of swivel-heads, a feed-wheel journaled on each head and provided with a gear, a drive-shaft, a series of drive-gears carried by said shaft, intermediate gears carried by each swivel-head in mesh with the gear of the corresponding feed-wheel and with one of said drive-gears, and means for axially shifting the drive-shaft and simultaneously swinging said intermediate gears and feed-wheels, substantially as described.

7. In an apparatus of the character described, the combination of a swivel-head, a feed-wheel journaled thereon, a gear carried by said feed-wheel, a stub shaft carried by said swivel-head, a sleeve journaled on said stub-shaft, an axially-adjustable shaft, a drive-gear secured thereto, intermediate gears carried by said sleeve in mesh with said drive-gear and with the gear carried by the feed-wheel, and means connecting said stub-shaft to said axially-adjustable shaft, substantially as described.

In witness whereof I have hereunto set my hand in the presence of two witnesses.

JOSEPH MOREAU.

Witnesses:
  L. LARUE,
  JULES BRIEN.